US012320321B2

(12) United States Patent
Dick

(10) Patent No.: US 12,320,321 B2
(45) Date of Patent: Jun. 3, 2025

(54) WAVE ENERGY CONVERTER

(71) Applicant: William Dick, Rathvilly (IE)

(72) Inventor: William Dick, Rathvilly (IE)

( * ) Notice: Subject to any disclaimer, the term of this patent is extended or adjusted under 35 U.S.C. 154(b) by 0 days.

(21) Appl. No.: 17/974,384

(22) Filed: Oct. 26, 2022

(65) Prior Publication Data

US 2023/0073634 A1 Mar. 9, 2023

Related U.S. Application Data

(63) Continuation-in-part of application No. PCT/EP2021/057795, filed on Mar. 25, 2021.

(30) Foreign Application Priority Data

Apr. 28, 2020 (GB) ...................................... 2006228

(51) Int. Cl.
  *F03B 13/00* (2006.01)
  *F03B 13/14* (2006.01)
  *F03B 13/24* (2006.01)

(52) U.S. Cl.
  CPC ............ *F03B 13/142* (2013.01); *F03B 13/24* (2013.01)

(58) Field of Classification Search
  CPC ........ F03B 13/142; F03B 13/24; F03B 13/20; F03B 13/14; F05B 2270/18; F05B 2270/202; Y02E 10/30
  See application file for complete search history.

(56) References Cited

U.S. PATENT DOCUMENTS

| 5,570,893 A | 11/1996 | Swande |
| 5,770,893 A | 6/1998 | Youlton |
| 2016/0169188 A1* | 6/2016 | Dick ....................... F03B 13/24 |
| | | 290/53 |
| 2019/0353139 A1* | 11/2019 | Sheldon-Coulson ........................ |
| | | F03B 13/142 |

FOREIGN PATENT DOCUMENTS

| DE | 102009013014 A1 | 9/2010 |
| GB | 2004330 A | 3/1978 |
| GB | 2161544 A | 1/1986 |

(Continued)

OTHER PUBLICATIONS

PCT/EP2021/057795, International Search Report and Written Opinion mailed May 12, 2021, 14 pgs. total.

(Continued)

*Primary Examiner* — Julio C. Gonzalez
(74) *Attorney, Agent, or Firm* — Husch Blackwell LLP

(57) ABSTRACT

A point absorber wave energy converter is described. The converter uses a surface piercing float operably coupled to a water column tube extending downwardly from the surface piercing float, the tube being open at its bottom and being configured to accommodate a column of sea water therein. Air is trapped above that column within a plenum, the plenum being configured such that operably relative movement between the point absorber and the internal water column expands and compresses the trapped volume of air. That movement can be used to pump air through an open or a closed circuit power take off system. The open circuit power take-off system as described is suitable for other oscillating water column wave energy converters including both floating offshore and fixed shoreline installations.

12 Claims, 17 Drawing Sheets

(56) References Cited

FOREIGN PATENT DOCUMENTS

| | | |
|---|---|---|
| GB | 2510298 A | 8/2014 |
| GB | 2594477 A | 3/2021 |
| WO | 2012095832 A1 | 7/2012 |
| WO | 2015001115 A1 | 1/2015 |

OTHER PUBLICATIONS

PCT/EP2023/079836 International Search Report and Written Opinion mailed Feb. 8, 2024, 13 pgs.
United Kingdom Intellectual Property Office Search Report dated Aug. 19, 2020 for Application No. GB2006228.7, 4 pages.
International Preliminary Report dated Oct. 27, 2022 for International Application No. PCT/EP2021/057795, 8 pages.

\* cited by examiner

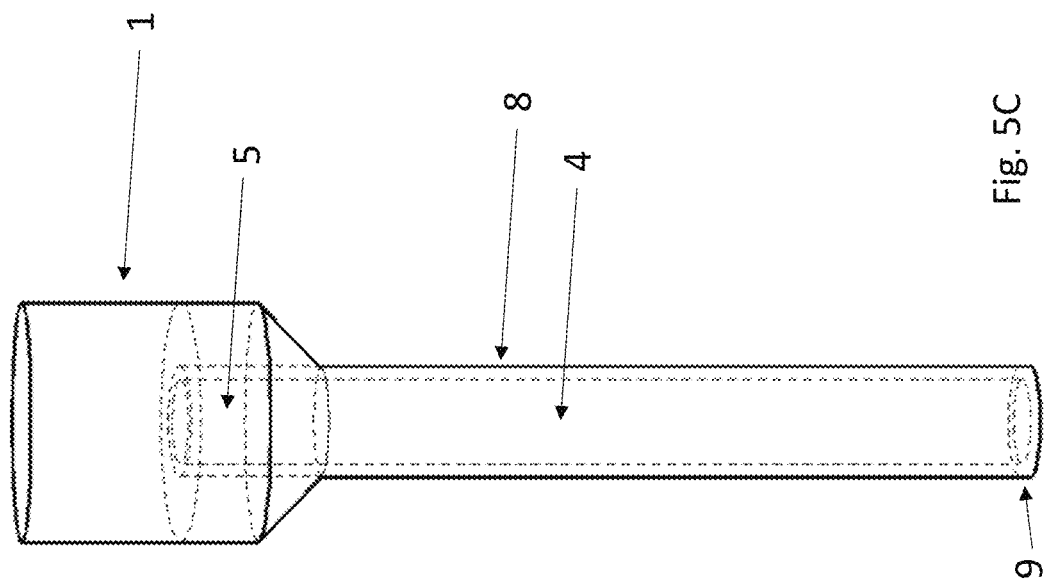
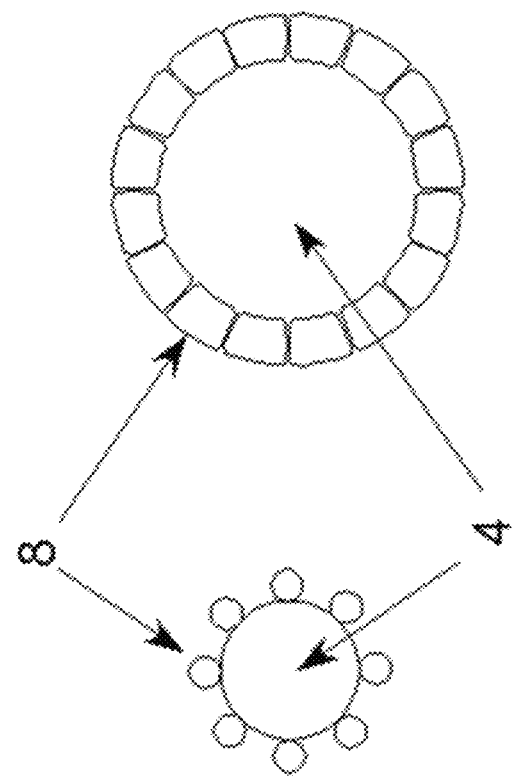
Fig. 5A
Fig. 5B
Fig. 5C

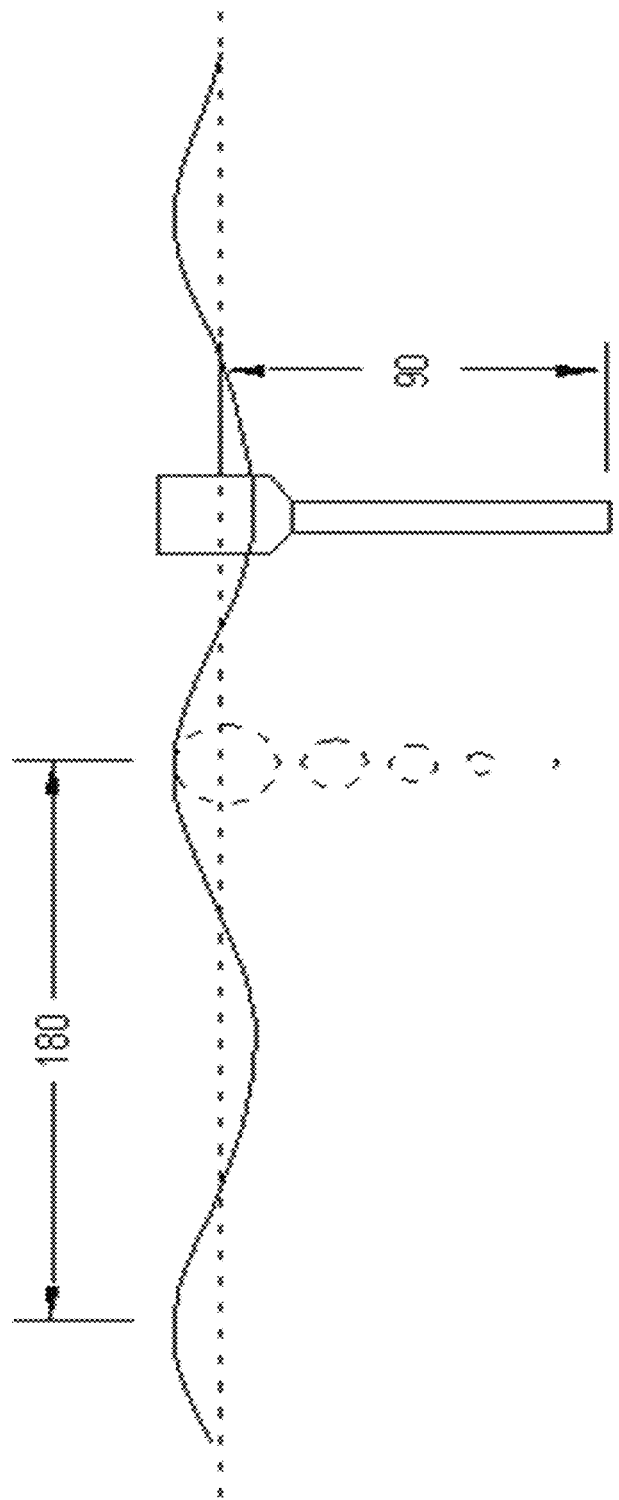

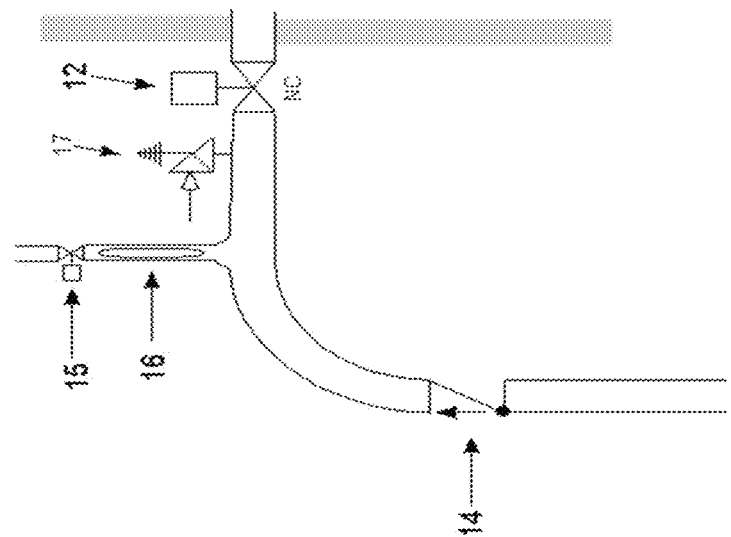
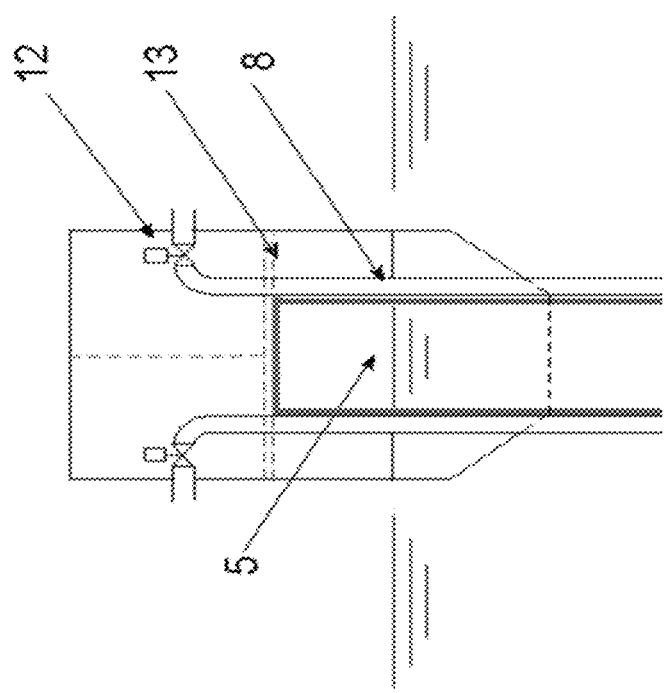
Fig. 10

WAVE ENERGY CONVERTER

CROSS-REFERENCE TO RELATED PATENT APPLICATIONS

The application is related to and, to the extent possible, is a continuation-in-part of International Application No. PCT/EP2021/057795, filed Mar. 25, 2021, which timely claims priority to and the benefits of GB Patent Application Number 2006228.7, filed Apr. 28, 2020, the disclosures of which are all incorporated herein for all purposes as if set out in full.

FIELD OF THE INVENTION

The present invention relates to a wave energy converter. In particular, the present invention relates to a wave energy converter air volume changes within a plenum, resultant from wave action, to drive one or more turbines.

BACKGROUND

The development of a wave energy converter suitable for deployment in utility-scale arrays in energetic offshore sites has been frustrated by two crucial issues:
- Survival, both in extreme conditions and over the lifetime of the development
- Cost of electricity delivered to the grid.

The prospects of survival and good operational availability for the lifetime of a development are enhanced if the device is sea-worthy and avoids complexity. A wave energy absorber must function where there is significant wave energy, that is, at or close to the surface, in exposed sites, and preferably over water more than half a wavelength in depth, such as in the North Atlantic off NW Europe and latitudes between 40° and 60°. The greater part of the wave energy is associated with wavelengths of 180 to 200 metres, meaning that the raw energy will be appreciably reduced at depths less than 90 metres. Oscillating systems capable of resonating with the incident waves are can be very effective energy absorbers. Energy is typically absorbed by one or more large masses that may be arranged to oscillate in response to the excitation provided by the waves. Recovering this absorbed mechanical energy requires that the oscillating mass must react via some power take-off system against another and preferably at least comparable mass, or the seabed.

The energy absorbing mass may be negative in the form of a partially or totally submerged buoyant body, in which case it must be rigidly anchored and arranged to react against the seabed. The present inventor has realised that reacting against the seabed is a less practical solution in deep waters and will not be considered further here.

Heaving buoy point absorbers are the simplest of the oscillating systems. These are necessarily small in cross-section with respect to the wavelength. In order to incorporate sufficient mass, they may be extended vertically, in the form of a spar buoy.

A single-bodied floating buoy on compliant moorings is a simple, low-cost, and sea-worthy structure with good prospects of survival in energetic sites. Single-bodied and self-reacting point absorbers have existed since the 1960's, where the incident wave energy was absorbed by an oscillating water column (OWC). Since then there have been significant advances in OWC point absorbers for the generation of electricity.

However, the amount of energy that may be absorbed by an OWC point absorber is limited by the mass of the oscillating water column, which must be 'small' in diameter with respect to the wavelength and of a length and depth below the surface that will respond to and preferably resonate with the wave frequency.

In our earlier patent application WO2015/001115 there is described a heaving buoy point absorber of spar-buoy form, comprising two interacting massive bodies, a spar buoy and an internally trapped column of water, open to the sea at the bottom. Although similar in that it comprises a point absorber with an internal water column, the device of WO2015/001115 differs in principle from an OWC point absorber in that the buoy itself is designed to oscillate in heave and absorb energy from the incident waves. This arrangement provides scope for tuning and control not available to an OWC point absorber, and the internal water column is not limited in its draft by the need to behave as an OWC. The mass of the heaving buoy and of the water column may be as large as is consistent with remaining as a point absorber, facilitating a more powerful device.

FIG. 1 of WO2015/001115 (reproduced here as FIG. 1) shows a massive heaving buoy that reacts against an internally trapped column of water. This trapped water column is in communication with the sea at the base of chamber 105 which is located above the inertial mass tanks 146.

It is evident from the Figure and the descriptions in WO2015/001115 that the extent and therefore mass of this water column will be constrained by the presence of the inertial mass tanks 146 below it and the need of the whole device to remain of small diameter with respect to the dominant wavelengths. It is evident from the Figure and descriptions that the total mass of the heaving buoy, the seawater enclosed in tanks 125 and 146, the ballast, plus all structural components and the added mass when in motion, equates to considerably more than the water column within chamber 105.

WO2015/001115 as described,
- makes no claim nor would allow that the mass of the entrapped water column within chamber 105 against which the heaving buoy reacts should be similar to the entire mass of the heaving buoy so that maximum power may be recovered from their interaction.
- makes no claim nor cites a method nor is aware of the benefits to be obtained by a facility to adjust the ratio of the mass of the heaving buoy to the mass of the internal water column against which it reacts.
- does not recognise the benefits that may be gained by ensuring that the base of the internal water column is at a depth of half a wavelength or more below the surface.

As described in WO2015/001115 the natural period in heave is designed to match that of the incident waves by incorporating submerged tanks 125, 146 that enclose a large neutrally buoyant mass of seawater (the 'inertial mass'), rigidly connected to the surface-piercing buoy.

This inertial mass may be adjusted by opening flap valves at the top 148 and bottom 150 of one or more of these tanks. This will alter the buoy's natural period in heave, making it possible to better match its response to changing conditions. These valves may be arranged to act as a fail-safe mechanism as, once all opened, a large water-mass is no longer trapped and the buoy's natural period in heave will shift away from any risk of resonance. Tuning and fail-safe are very advantageous features.

However, the present inventor of WO2015/001115 has since realised that the incorporation of this inertial mass as embodied in WO2015/001115 has certain disadvantages:

The assembly of tanks 125 and 146 is necessarily large and will give rise to significant viscous drag, resulting in a poor drag-to-mass ratio.

The valves and their associated mechanisms are permanently underwater. At commercial scale the lower valves could be at depths of more than 70 metres and will be several metres across. Their capital costs, the risks of failure, and the costs of maintenance and repair will all be high. They may be a hazard for cetaceans.

The performance and safety of the device of WO2015/001115 depends on the reliable operation of these valves. If they remain closed and fail to open in extreme conditions, then there is a risk of excessive heave excursions resulting in damage.

WO2015/001115 describes an inertial or 'adjustable reference' mass retained in tanks 125 and 146 but makes no mention of losses arising from radiated waves that the structure as described will generate during normal operations.

SUMMARY

Accordingly, there is provided a wave energy converter as defined in the claims that follow.

BRIEF DESCRIPTION OF THE DRAWINGS

FIG. 5A is a plan view of a first configuration of tubes in accordance with the present teaching;

FIG. 5B is a plan view of a second configuration of tubes in accordance with the present teaching FIG. 5C illustrates how the arrangement as in 5B may be embodied.

FIG. 6 illustrates how the bottom opening of the main central column of seawater is typically half the wavelength of the design target waves below the mean sea level in accordance with the present teaching.

FIG. 10 shows an arrangement whereby the response of a converter in accordance with the present teaching may be altered by altering the amount of the inertial mass tube.

DETAILED DESCRIPTION OF THE DRAWINGS

There now follows a description referring to FIGS. 2 to 18 which is provided to assist in an understanding of the present teaching. It is not intended to limit to the specifics of what is herein described except as may be deemed necessary in the light of the claims that follow.

Figure 1:
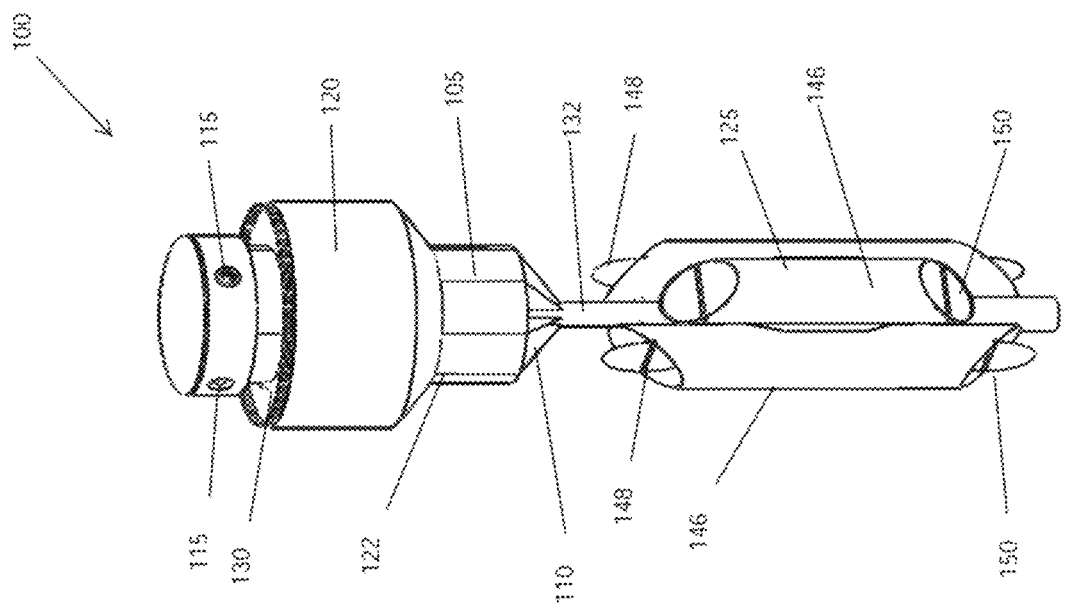
FIG. 1 is a schematic of a wave energy converter in accordance with the prior art.

The detail of FIG. 1 has been described above from which it is evident that this corresponds to FIG. 1 of our earlier application, WO2015/001115, and exemplifies the present state-of-the-art in heaving buoy point absorbers that include a large and adjustable inertial mass of seawater. This seawater mass is held in tanks 125 and 146 by means of flap valves 148 and 150. The heaving buoy reacts against a column of water trapped within cylindrical enclosure 105 which is open at the bottom 110.

Figure 2:
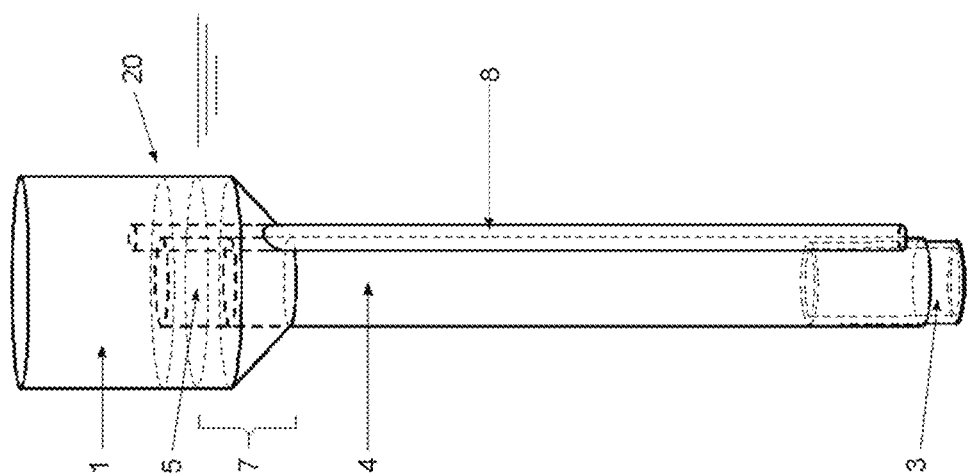
FIG. 2 is a schematic of a wave energy converter in accordance with the present teaching.

FIG. 2 is a line drawing of an improved wave energy converter in accordance with the present teaching. As will be appreciated by those of skill, it is a point absorber having a surface-piercing float 1. The surface piercing float includes fixed buoyancy, 7 and a deck, 20. The large and adjustable mass of seawater is now held by means of atmospheric pressure in long tubes 8 attached to the surface-piercing float 1. It will be appreciated that for ease of illustration only one of these tubes is shown in the drawing. This combination of float, inertial mass and ballast when acting as a heaving buoy reacts against a column of seawater of comparable mass 4 held within a central tube open at the bottom and extending above the internal free surface to enclose an air plenum 5. Details of these and further improvements embodied in the present teaching are now described with references to the following drawings.

Figure 3:
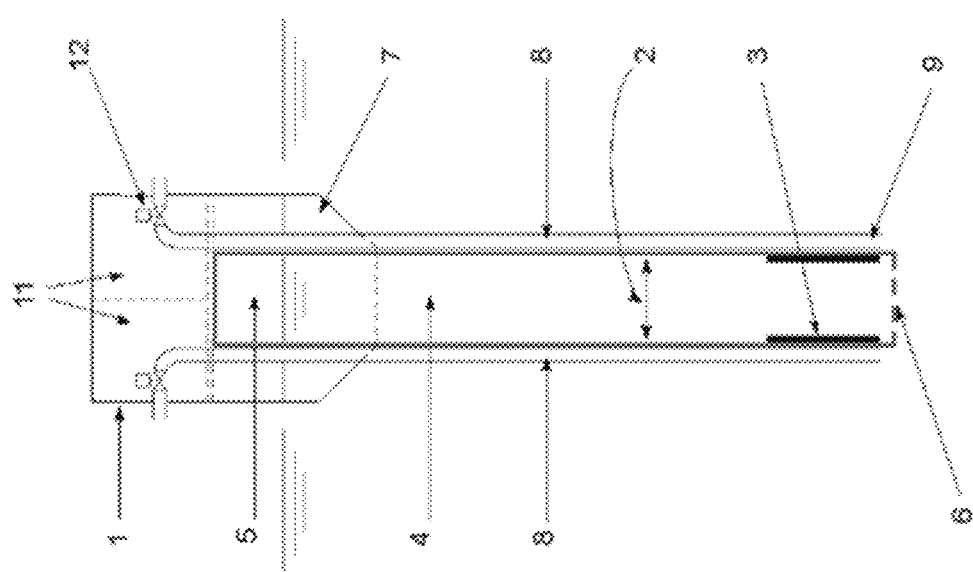
FIG. 3 is a schematic sectional view of the converter of FIG. 2.
Figure 8:
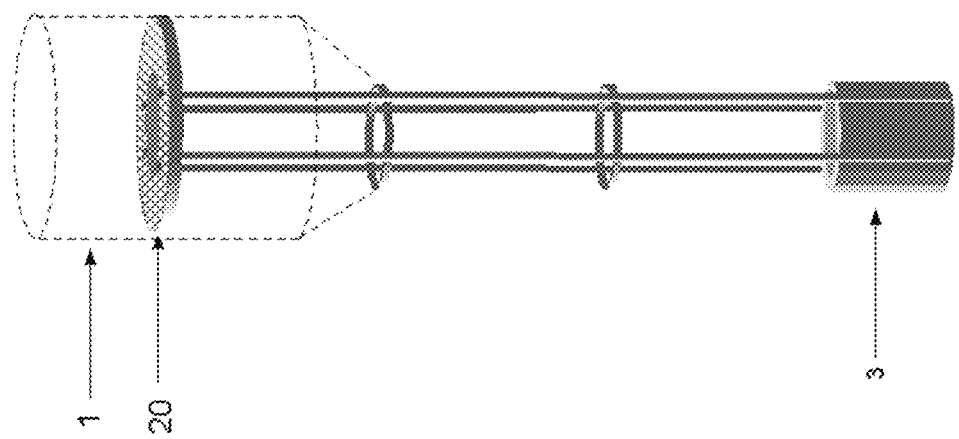
FIG. 8 indicates how a lightweight polymer structure may be supported in accordance with the present teaching.

As is perhaps more evident from inspection of the sectional view of FIG. 3, the surface piercing float of the device of FIG. 2 differs from that of FIG. 1 in that it comprises a fixed buoyancy 7 and two air accumulator spaces 11, surrounding an internal plenum 5 above the free surface of a water column 4 within the central tube 2 which is in fluid communication with the sea 6. The surface-piercing float is coupled to a ballast mass 3 by a central tube 2 preferable at larger scale together with an open framework as indicated in FIG. 8.

It will be understood that within the surface piercing float 1 there exists a water plane area which is equivalent to cross-sectional area of the surface piercing float when operating and the volumes of air defined in regions 5 and 11 are not open to atmosphere. Extending the inertial mass tubes 8 through the surface-piercing float 1 to above the waterline allows atmospheric pressure to be used to retain the water mass within each tube, a bottom 9 of each of the inertial mass tubes being open to allow the water enter each tube. This new arrangement, however, means that the waterplane area of the surface-piercing float will change with changes in the number of inertial mass tubes that are open or closed to atmosphere. Changes in the water plane area will alter the natural period in heave of the device. Changes in the water-plane area due to releasing inertial mass will increase the natural period of heave, contrary to that being sought by reducing the mass. This adverse effect is to an extent mitigated by a reduction in the overall added mass when the inertial mass tubes are open.

The total cross-sectional area of the inertial mass tubes 8 in the device as described here with its deep draught will be relatively small at commercial scale, possibly 10% or less of the waterplane area of the surface piercing float. With a suitable choice of materials, the inertial mass may be of the order of 60% of the total mass. The changes in the natural period in heave will be proportional to the square roots of the changes in both the water plane area and, inversely, of the total mass including added mass. This effect relates only to the device operating as a resonant heaving buoy and is not expected to diminish performance in the two surface-follower operating modes. The arrangement as described brings substantial overall improvements in reduced drag, reduced radiation losses, lower capital costs, lower maintenance costs, and greater availability. These outweigh the marginal reduction in the effect of releasing the inertial mass.

A method of adjusting the inertial mass was described in WO2015/001115. However, per the present teaching and as based on principles that are readily understood with reference to the schematic of FIG. 4, the present invention embodies a more flexible and mechanically simpler arrangement that will also facilitate a more precise method of adjusting the inertial mass, which is in effect a mass attributed to a retained volume of sea water, attached to the heaving buoy.

Figure 4:
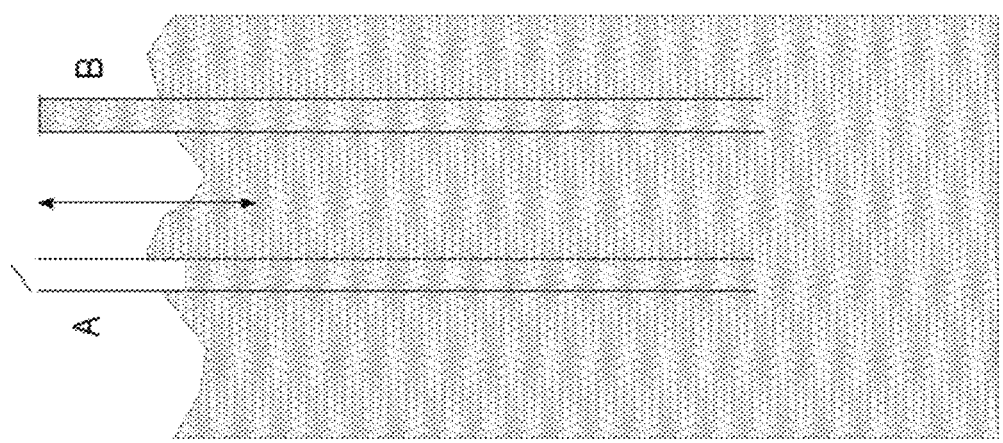
FIG. 4 is a schematic which illustrates the principle of using atmospheric pressure to retain an mass of sea water in an inertial mass tube that is open at the bottom but includes a valving arrangement at the top of the tube to facilitate a retention of the water in the tube during operation of the converter in accordance with the present teaching.

FIG. 4 illustrates the principle of using atmospheric pressure to retain an inertial mass of water in a tube 8 that is open at the bottom. By way of explanation, A and B in FIG. 4 are similar tubes, both open at the bottom, and A is also open at the top. By closing the top of a tube filled with water, as in B, atmospheric pressure will allow a column of water to be held a few metres above the surface level. It is less costly to install and to maintain a valved arrangement with valves at the top of the tubes, with no moving parts below the water line, and such an arrangement is also advantageous in that it consequently reduces the risks arising from component failure.

Based on this understanding, tubes that are open at the bottom, but which can be selectively closed at the top, may hold or release the volume of water that is located within the respective tube, and hence the inertial mass coupled to the heaving buoy. In this way deploying a plurality of tubes in accordance with this principle can advantageously be used to effect a means of adjusting the operating mass of a wave energy converter and hence its response characteristics. Given that the variation in mass may have an effect on the stability of the converter itself, it is desirable that when deployed that such tubes are symmetrically arranged about the converter, with tubes on opposing sides of the converter desirably contributing an equivalent inertial mass.

FIG. 5 illustrates in schematic form how at least four and possibly more than a dozen or more tubes would be installed in a commercial-scale unit, depending on the degree of fine tuning economically justified. FIG. 5 illustrates two arrangements. For smaller scale devices, FIG. 5A shows the tubes 8 that accommodate the inertial mass of seawater may be arranged around the central water column 4 within a large diameter pipe 2. In order to avoid viscous drag, a smaller number of larger diameter tubes 8 is to be preferred, as is available with for example smooth bore HDPE extruded water pipes. At larger scales, and with the need to accommodate a correspondingly larger inertial mass, and to minimise costs, FIG. 5B indicates how the tubes 8 may be arranged to contain the main central water column 4. FIG. 5C illustrates how a configuration as shown in 5B may be incorporated in order to minimise drag resistance to the heave oscillations and lateral forces that may arise from currents and wave Movements.

The controls used to operate the valves used to retain or release the water column in each tube may be linked (electrically or mechanically) in diametrically opposite pairs to help maintain operational balance and an even keel.

These tubes holding the inertial masses of seawater are configured so that, in the event of extreme oscillation as may arise in very high seas, the atmospheric seal is automatically broken and the inertial mass released, resulting in a reduction in the natural frequency of heave of the buoy and a shift away from resonant conditions. Two exemplary methods of automatically achieving this fail-safe condition are described in the FIGS. 10 and 11 below.

The cross-sectional dimensions of a point absorber per the present teaching are generally small with respect to the dominant wave length of the geographic location where the device is deployed, making a spar buoy the appropriate geometry when a large mass is to be included. This has a further advantage.

FIG. 6 illustrates that the bottom opening of the main central column of seawater 4 is typically half a wavelength below the mean sea level. In the event of deployment for example in North Atlantic conditions where a typical wavelength is of the order of 180 metres, this implies a depth of a device per the present teaching of about 90 metres below the mean sea level of the deployment location where the device is situated.

Having a device which provides a water column that extends to, and has an opening at, about 90 m below the mean sea level results provides a number of distinct advantages including:

1. A internal water column of a mass that is now comparable to that of the spar buoy, making it possible to optimise energy recovery from the interaction of the two masses.
2. Any tendency for the internal water column to oscillate in response to surface wave action and to follow the heaving buoy is eliminated for those wave periods where a resonant mode is intended.

The internal free surface will tend to remain at the mean sea level when no damping is applied, even though the buoy may be oscillating in heave or simply following the wave surface.

Once damping is applied, as when the system is closed and a pressure difference is being established or being maintained between the high- and low-pressure accumulators, the air plenum over the internal free surface will act as a spring. This will then act on the level of the internal water column, depressing it during the compression cycle, raising it during the expansion cycle. The stiffness of this spring, and hence the degree of coupling between the buoy and the internal water column, is proportional to the pressure difference between the accumulators.

The stiffness of this air spring will depend in the incident wave climate and may be controlled by the setting of the HP and LP valves including latching, and the reaction provided by one or more power trains being engaged. It may be quickly released by opening the by-pass valve between the HP and LP accumulators.

Typically, the open mouths of the inertial mass tubes 8 which are located at the bottom of these tubes will also be at these depths. It will be appreciated that the co-location of the open mouths of both the central tubes and the inertial mass tubes is not necessary but where provided it can advantageously assist in helping to maintain the slim shape of the tubular under water components of the device whilst allowing the necessary width of the surface piercing float.

In waves of a period longer than those that may induce a significant heave response, it is safe to retain the inertial mass, enhancing energy conversion for the surface follower mode. As the corresponding wavelengths will be greater than twice the design draft, the internal water column may begin to oscillate. This may be usefully exploited if a suitable phase difference is maintained between the surface follower and the oscillating internal water column.

As is exemplified with reference to FIG. 8, the main hull structure, ie the surface-piercing float 1, may fabricated conventionally from welded steel plate with ribs for stiffening. Light-weight materials such as polymers are the preferable material for the main tube 2 and the tubes 8 that hold the inertial mass. Polymers are of close to neutral mass in seawater, with the result that the inertial mass held in tubes 8 will be a correspondingly larger fraction of the total mass of the heaving buoy than possible with a steel structure. This increases the effectiveness of altering the inertial mass. The main tube will need a support frame if assembled from polymers. One arrangement is indicated, comprising stainless steel tension rods between the PTO deck and the ballast, holding under compression pipes designed for high jacking forces. Additional bracing or dampers (not shown) may be introduced to avoid a risk of damaging vibration.

Figure 9:
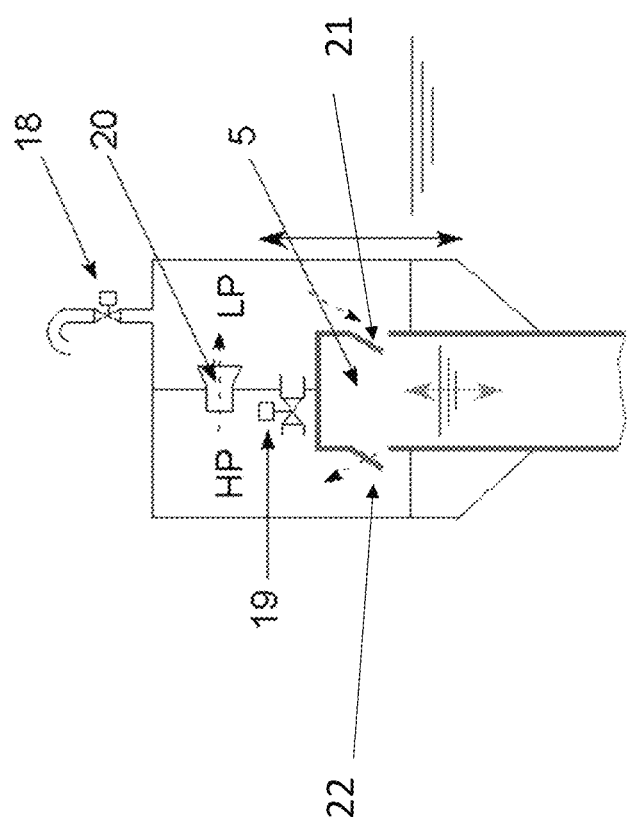
FIG. 9 shows an arrangement whereby a converter in accordance with the present teaching operates as a dual action pump, circulating air in a closed system through one or more air turbines.

FIG. 9 shows how a device of the present teaching may be configured to operate as a dual action pump, circulating air in a closed system through one or more air turbines 20. The turbines 20 are preferably unidirectional turbines, i.e. air can only pass in one direction through the turbine. The pressure difference between the high-pressure, HP, and low-pressure, LP, accumulators is small, and the air flow rate is therefore high. For this reason, smaller turbines which are configured to operate with high RPMs may be advantageous. Rotation rates of the order of 3,000 or more RPM will result in smaller components that are less expensive to purchase and to maintain.

When operating, air is forced during the sinking or compression stroke from the plenum 5 into a high-pressure air accumulator 'HP' and drawn into the plenum during the rising expansion stroke from a low-pressure air accumulator 'LP'. One-way valves between the plenum 5 and the air accumulators ensure that air flows are in the correct direction enabling a close to steady flow to be established through one or more air turbines 20 placed between the accumulators. These valves will be of a sufficient size to ensure only minimal impedance to airflows. They may also be held closed (mechanisms not shown) during part of each cycle in order to control the response of the point absorber and to improve energy absorption, a technique known as 'latching control'. This Figure shows two additional valves. Valve 19 provides an option to by-pass the air turbines and is of sufficient cross-sectional area to allow the pressures in the two accumulators to be equalised within one or two wave periods. Valve 19 will be arranged to be energised closed so that in the event of a system failure such as the loss of the grid connection, or extreme seas it will fail open. Valve 18, and if necessary, in combination with valve 19, will allow adjustments to the total volume of air held in the accumulators and the plenum. This provides a method of adjusting the difference between the average pressure within the system and atmospheric pressure, and hence the still water draft of the surface-piercing float and the spring effect of the plenum.

Detailed modelling has shown that the volume of each air accumulator should be approximately five to seven times greater than the still-water volume of the plenum. This allows a suitable build up in both the high- and low-pressure air accumulators, facilitating a steady flow through the one or more air turbines.

Figure 14:
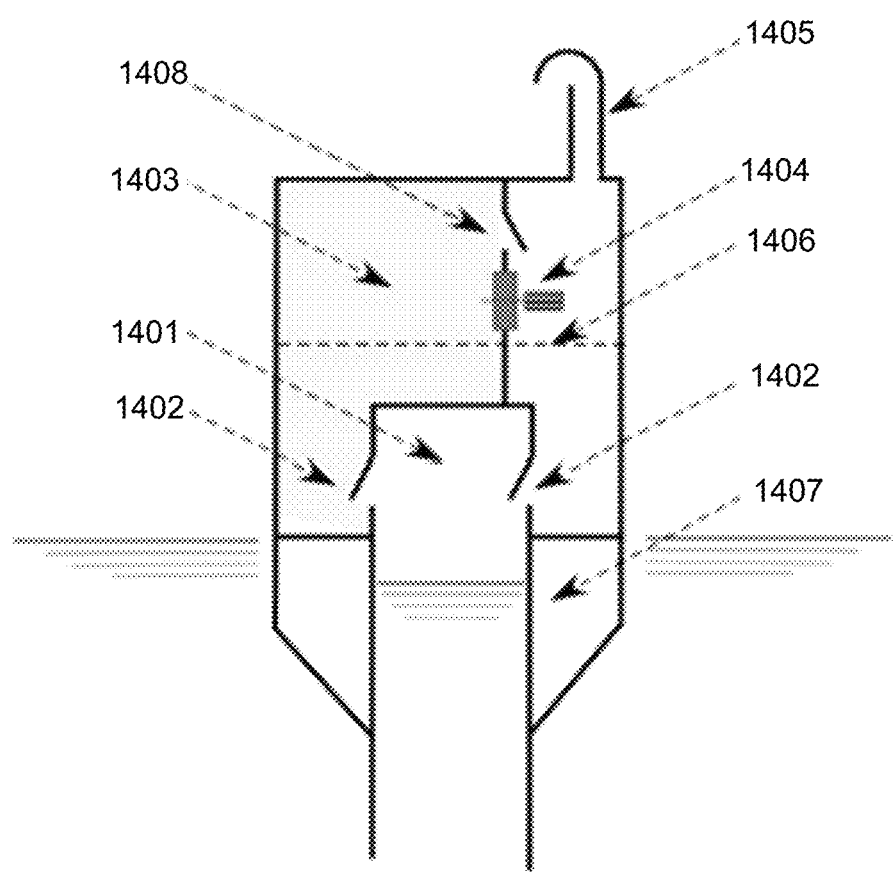
FIG. 14 is an alternative arrangement to that shown in FIG. 9 wherein a power take off converter in accordance with the present teaching operates to convert airflows that vary in direction and rate to steady mass flows using one or more air turbines that are configured to rotate in a single direction.

FIG. 14 shows an alternative power take off configuration to that discussed with reference to FIG. 9. In this configuration, instead of a closed loop from the high pressure (HP) to the lower pressure accumulators, the low pressure accumulator of FIG. 9 is now provided at atmospheric pressure. In this way an open cycle system is maintained with the plenum or pumping chamber (1401) drawing from, and the turbines (1404) discharging air to, atmosphere (1405). The pumping chamber (1401) functions to serve as a source of air from which the turbines (1404) are powered-similarly to how the plenum (5) of FIG. 9 operates. Within the context of the present teaching the two terms (plenum and pumping chamber) will be used interchangeably. Similarly to FIG. 9, the turbines are provided above deck level (1406) ensuring easy access to same for maintenance purposes. The convertor when deployed in off shore environments is desirably in a housing that incorporates some fixed buoyancy elements (1407) to ensure stability in operation.

Similarly to that discussed above vis a vis FIG. 9, in this configuration a high-pressure air accumulator (1403) is provided between the pumping chamber (1401) and the turbines (1404). The high pressure air accumulator preferably has a capacity five or more times the still water volume of the pumping chamber (1401).

In order to effectively control the pressure within the high pressure accumulator (1403) valves (1402) are provided between the pumping chamber (1401) and the HP air accumulator (1403). Selective actuation of the valves (1402) controls the flow of air into and out of the pumping chamber (1401)—it will be seen from FIG. 14 that they are provided on both the inlet (that leading into the pumping chamber 1401) and feed (that leading into the HP accumulator 1403) ports. A bypass valve arrangement (1408) may also be provided between the HP accumulator and the atmospheric chamber so as to allow a bypass of the turbines (1404) should the requirement arise. It will be appreciated that opening of this bypass valve (1408) may serve to equalise the pressure across the chambers, effectively the pressure within the nominally HP accumulator may be reduced to atmospheric pressure.

The power take off can include a plurality—for example two or more—turbine-generator sets (1404). Typically, these power trains will be provided in parallel such that each is exposed to the same pressure drop across the turbines that are provided therein. Any one power train may be closed by an iris diaphragm or similar valve arrangement when not engaged. It is believed that four sets of turbines operating in parallel will be particularly advantageous, firstly in order to match an energy flux that may vary by two orders of magnitude and, secondly, to ensure good availability in the event that a power train is off-line, for maintenance or on account of failure.

In this configuration power is generated through the passage of air out of the HP accumulator, as such the air turbines are unidirectional turbines only requiring a spinning in the one direction. Advantageously the air flow across the turbines will result in rates typically at 10,000 rpm or greater.

Figure 16:
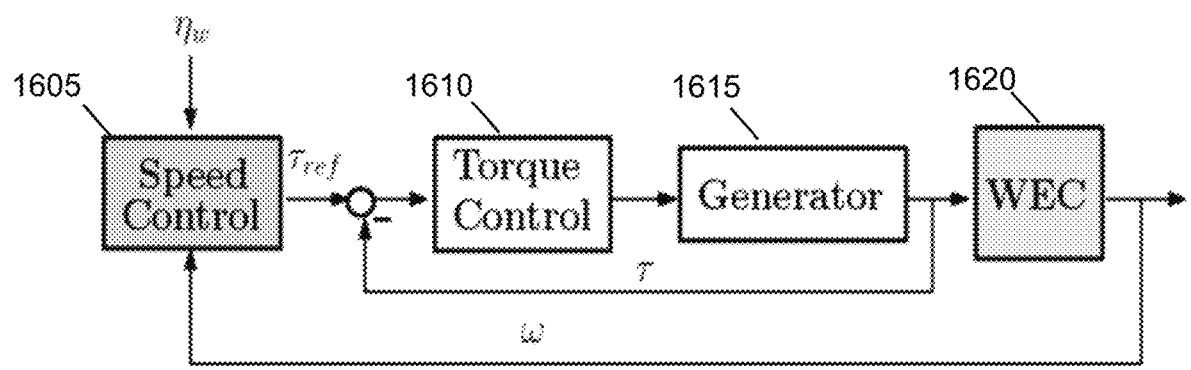
FIG. 16 is a schematic showing how speed control of the power take off of FIG. 14 can be controlled through use of a feedback mechanism.

The turbines (1404) are preferably directly coupled to high rpm switched reluctance direct current generators (1615) such as through the configuration schematic of FIG. 16 speed control (1605) and torque control (1610) can be provided via the generator (1615) to ensure that the turbines within the energy convertor (1620) are spinning at high efficiency. High efficiency of the air turbines may be assured by keeping the instantaneous flow coefficient within an acceptable range (such as that shown in FIG. 17). The flow coefficient is determined using data from sensors recording air flow rates and the pressure drop across the power train. The formula for a simple unchoked system and negligible temperature differences is:

$$Cv = Q\sqrt{\left(\frac{\rho}{\Delta P}\right)}$$

where $C_v$ is the flow coefficient, Q is the rate of flow, $\rho$ the density of air and $\Delta P$ is the pressure drop across the air turbine.

Figure 15:
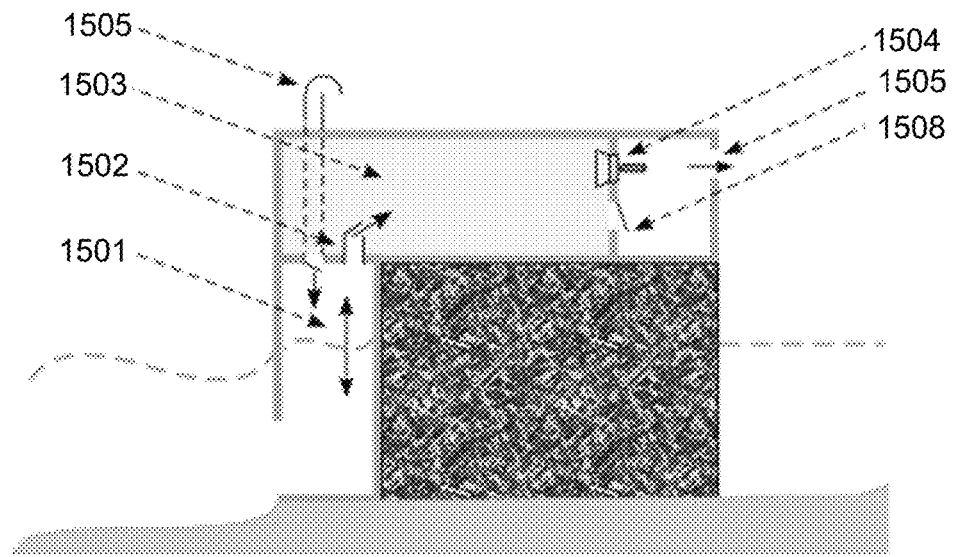
FIG. 15 shows an example of a deployment of the power take off of FIG. 14 is deployed to extract energy from an oscillating water column in a breakwater environment.
Figure 17:
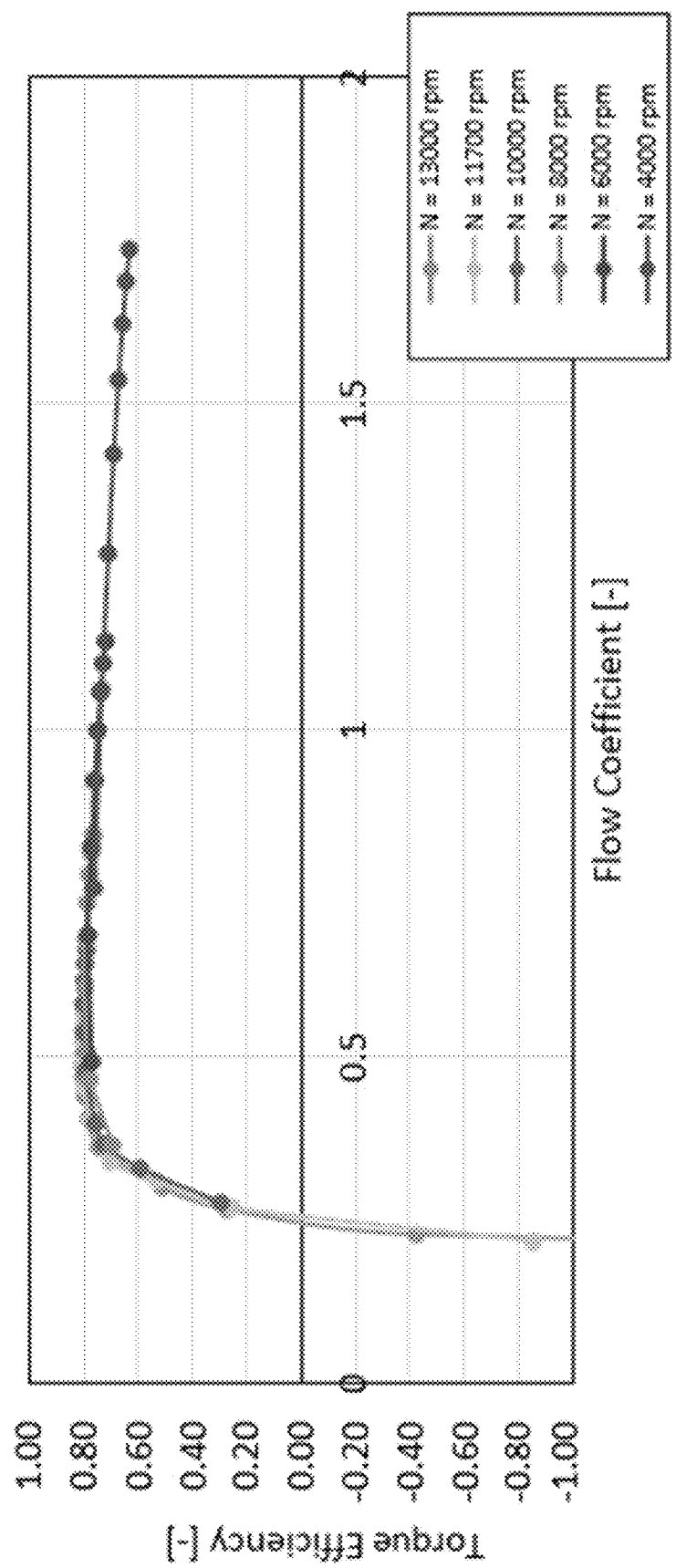
FIG. 17 shows a graph of torque efficiencies verses flow coefficient for a variety of different operational speeds for turbines.

The arrangement of FIGS. 14, 15, and 16 offers a number of advantages over the arrangement of FIG. 9 specifically as a result of more efficient conversion of the captured energy. FIG. 17 shows a graph of torque efficiency verses flow coefficient at a number of different rates of rotation (rpm) of turbines. It can be seen that the performance of the turbines at rates varying from 4000 rpm to 13000 rpm is effectively equivalent, which evidently broadens the range of operation within which a converter per the present teaching can efficiently generate energy. This can be related to the fact that:

1. The open circuit system with higher mean air pressures means a reduction in potentially damaging pressure spikes associated with the closed (HP to LP) system
2. air turbines (1404) operate from air flow in one direction, enabling continuously high efficiencies, preferably associated with a broad range of speeds,
3. axial flow impulse and reaction air turbines with fixed guide vanes and no sliding valves can be used,
4. with high rpm turbines directly coupled to generators there is no requirement for any gearbox,
5. torque control, based on the flow coefficient determined from sensed airflow rates and pressure drops, is used to optimise turbine rpm (FIG. 4),
6. high speed switched reluctance DC generators are robust, brushless, have no permanent magnets, have coils only on the stator, and are fault tolerant,
7. inverting DC to AC power and ensuring grid compliance may be centralised for a multiplicity of power trains, and located separately from the primary energy conversion,
8. two or more turbine-generator sets in parallel, not necessarily of the same rated capacity, allows the engaged capacity to match the prevailing energy flux,
9. two or more turbine-generator sets in parallel improves availability.

In addition to simplicity and more efficient conversion, having robust, compact, plug-in units enables off-site servicing and lower capital and maintenance costs.

FIG. 10 shows how the response of the heaving buoy may be altered by altering the amount of the inertial mass retained. During normal operations all or most of the tubes 8 will be filled with seawater up to valve 12 which remains closed, check valve 14 will be held open, the water being held above mean sea level by atmospheric pressure. Opening valve 12 for any one tube will open that tube to the atmosphere and, provided that it is internally smooth and of sufficient diameter, the level of water within it will tend to that of the mean sea level and its mass will cease to be closely coupled to that of the heaving buoy.

A multiplicity of tubes provides scope for fine tuning, or 'storm-by-storm' control, provided that the total available mass of seawater within them is a significant fraction, say of the order of 50% or more, of the total mass of the heaving buoy.

Opening all valves 12 will de-couple all the trapped inertial mass and hence shift the response of the heaving buoy away from resonance with any probable wave frequency. This is a fail-safe mode.

In extreme weather and very large waves, the combination of the heaving excursion of the buoy and the elevated wave surface on which it floats may result in the top of the tubes 8 being more than 10 metres above the mean sea level. Atmospheric pressure cannot support a water column of this height and cavitation will result if the tube was filled and valve 12 closed. This condition will automatically trigger vacuum release valve 17 and the system will 'fail safe'. In this way a device per the present teaching will then act as a surface follower rather than as a heaving buoy. Recovery of useful power may continue on account of the alternating difference between the external wave surface and the internal free surface within the central column which will tend to remain at mean sea level as it senses conditions at depths almost un-affected by the surface waves.

To re-charge an inertial mass tube the water within it needs to be raised typically two or three metres above sea-level. The water level in tube 8 may be raised by exhausting the air via valve 15. Alternatively, an inertial mass tube may be re-charged or partially re-charged in one or more steps if there are sufficient heave oscillations to drive the water levels within it past check valve 14 with valve 12 remaining open. Once the level passes, for example, sight glass 16 or a suitable sensor the valve 12 may be closed.

Figure 11:
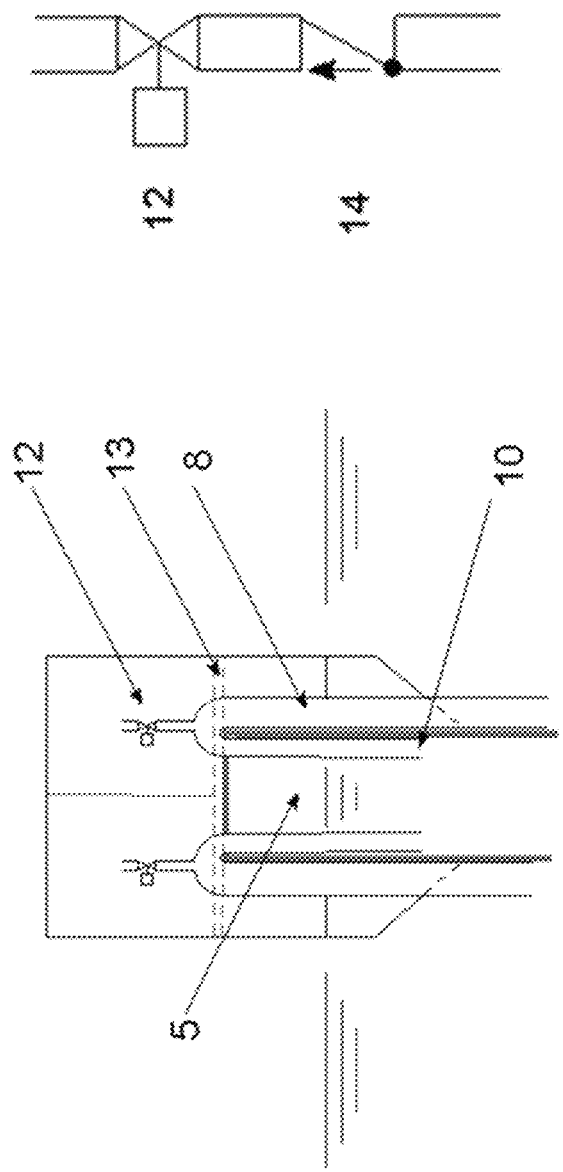
FIG. 11 shows another arrangement to that of FIG. 10 whereby the response of a converter in accordance with the present teaching may be altered by altering the amount of retained sea water within the inertial mass tubes.

FIG. 11 shows an alternative configuration whereby the upper end of each inertial mass tube 10 is led through the internal air plenum to terminate below the surface of the enclosed column of water. In extreme weather and very large waves, the combination of the heaving excursion of the buoy and the elevated wave surface on which it floats may result in the internal surface level in the plenum 5 dropping below the pipe opening 10 thus breaking the water seal and releasing the inertial mass. The depth below the internal surface level at which opening 10 is set determines when such a fail-safe condition is triggered.

In this arrangement, there is the possibility that each full inertial mass pipe may act as a siphon during normal operations when the level of the internal free surface is above or below the level external free surface. The mass within the tube will remain unchanged.

Figure 12:
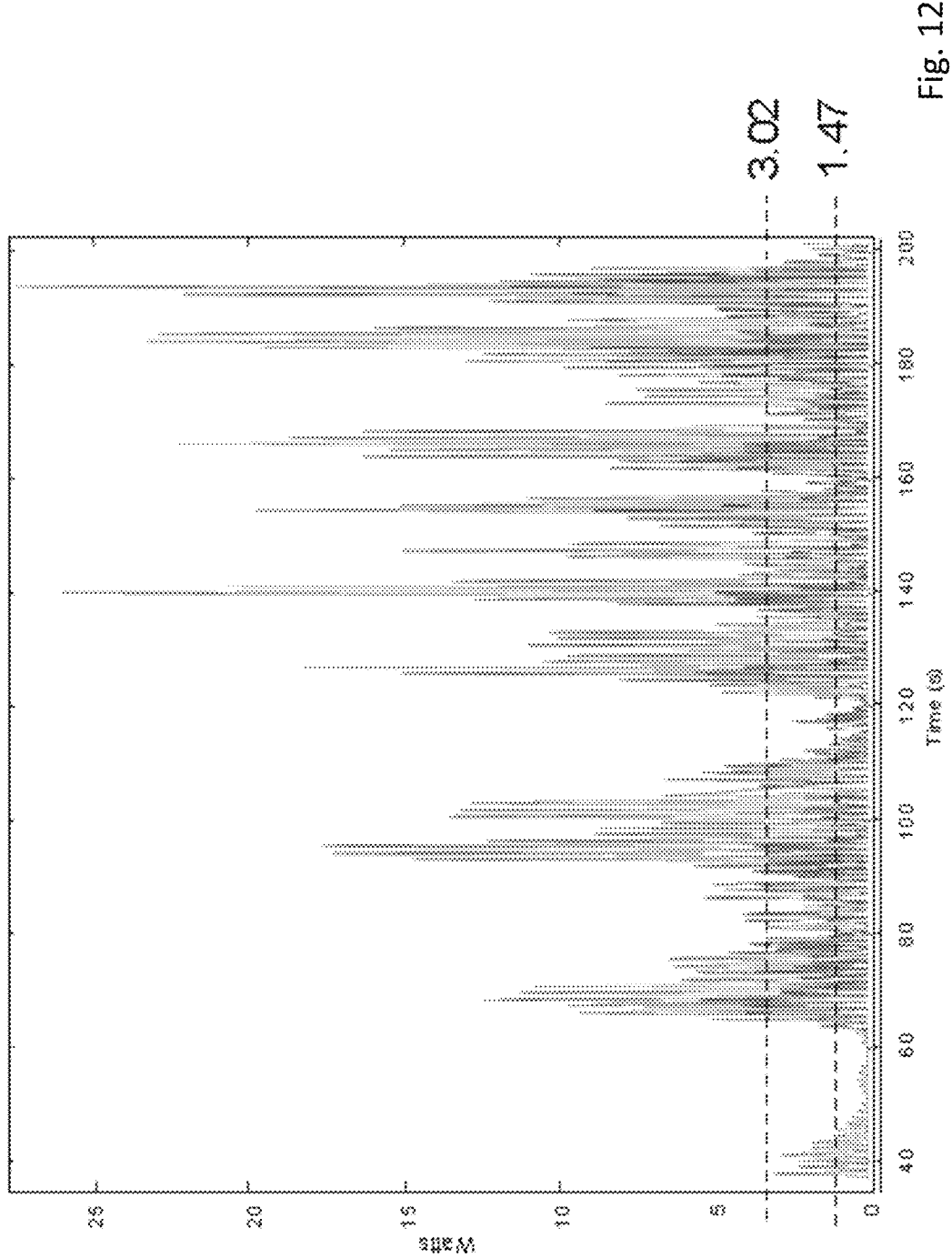
FIG. 12 is a numerical simulation comparing the power generated from scale model tests of a prior art device (dark lines) with the power from a scale model with greatly increased reaction mass (lighter shade) in accordance with the present teaching.

FIG. 12 is a comparison of power generated from scale model tests (dark lines) and from numerical simulation of a similar model with a greatly increased reaction mass (lighter shade). It will be appreciated that the average power has more than doubled. As commented on in the review of the present state-of-the-art above, this increase in the reaction mass, ie the extent of the water column 4, could not have been accommodated in WO2015/001115.

Figure 13:
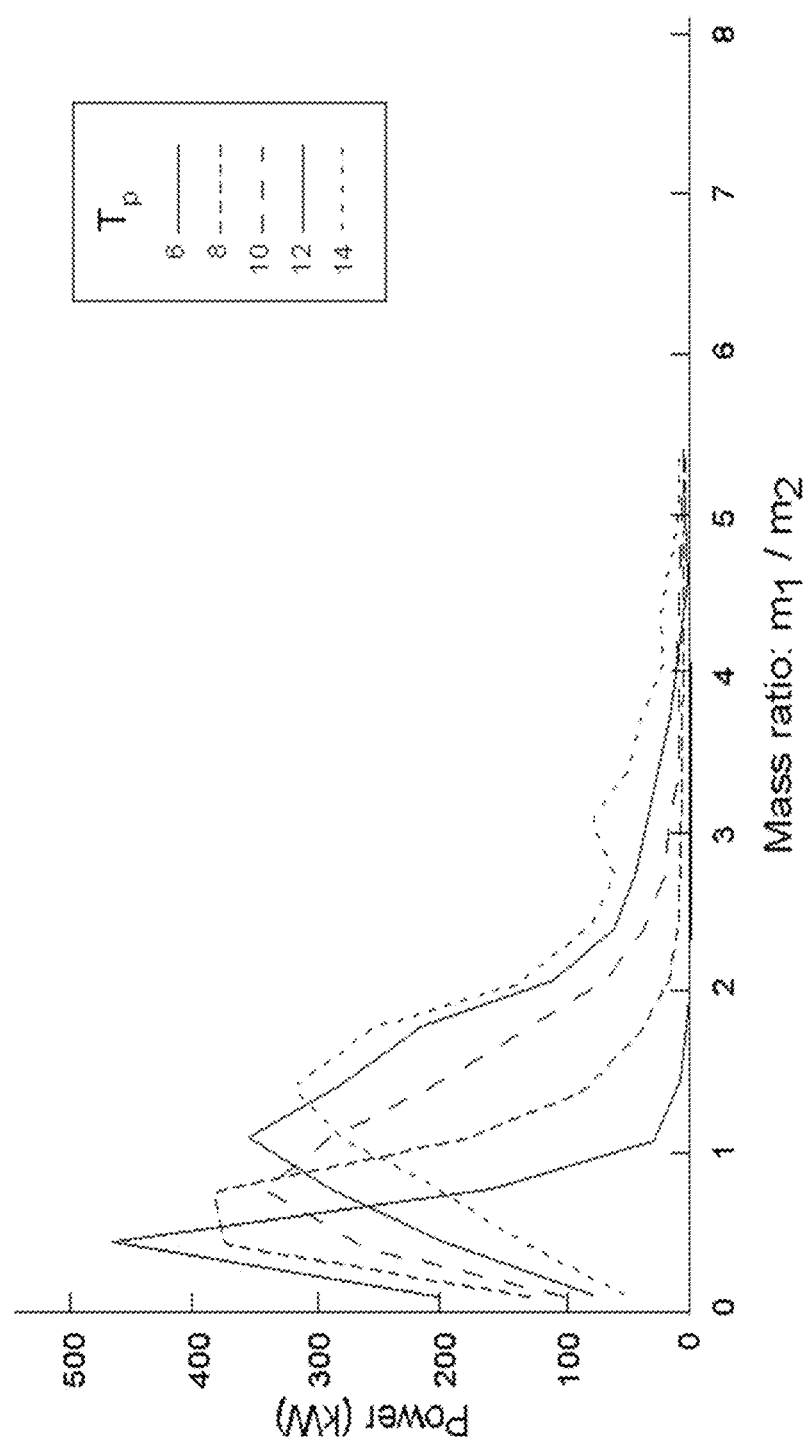
FIG. 13 shows the benefit in terms of recoverable power to be gained from an ability to alter the ratio of the mass of the heaving buoy to the mass of the internal water column in accordance with the present teaching.

FIG. 13 shows power curves and optimum mass ratios for wave periods from 6 seconds (reading from the left) to 14 seconds, and significant wave height 1.25 m. For energy distribution in a North Atlantic site, wave periods $T_p$ =10-14 seconds are most significant. Thus, the facility to adjust the ratio of the mass of the heaving buoy to that of the water column against which it reacts has important advantages in terms of energy absorption.

Whilst it is not intended to limit the present teaching to any specific geometric construction of dimensions unless necessary in light of the claims that follow, given that the wave energy converter per the present teaching is intended to operate in environments having energetic wave climates, such as the North Atlantic off the west coast of Ireland, there are some fundamentals in dimensions and masses of the system that need to be considered:

1. The diameter of the surface-piercing float 1 must be small with respect to the predominant wave lengths (approximately 20% or less) so that the device may act as a point absorber.
2. The entire mass of the device, excluding the inner water column 4, but including water held in tubes 8, ballast, and added mass when the point absorber is oscillating in heave, is of the order of five times greater than the displacement of the float when in still water so that the heave eigen value of the device is similar to the frequency of the target wave climate.
3. The ratio of the entire mass of the device to the mass of the water column 4 within central tube 2 will be adjustable and preferably in the range 0.75 to 1.40 to ensure maximum recoverable energy.
4. The bottom opening 6 of central tube 2 is located at a depth where water movement due to surface wave action is negligible for a large portion of all occurrences.

The heaving buoy is operably coupled to an adjustable inertial mass distributed between a multiplicity of pipes 8 defining a variable volume for accommodating sea water therein. The total inertial mass held in tubes 8 should preferably be a large fraction of the total mass of the buoy in order to enable fine tuning of the heave eigen value.

This improved wave energy converter, intended for offshore sites, is scalable. Indicative dimensions and masses suitable for an energetic North Atlantic site are provided in the following section.

The cost of electricity measured as the levelised cost of electricity (LCoE) is the sum of all costs divided by the total value of power delivered, discounted over the lifetime of the project. The amount of useful electrical power recovered from the wave energy flux is a measure of the efficiency of the wave energy converter. For floating and self-reacting point absorbers this is typically 25% or less. The highly variable wave climate associated with an oceanic site as the North Atlantic provides a major challenge for a self-reacting oscillating system. The present invention seeks to improve performance across the possible range of conditions by adopting the following measures:

1. Reduce losses due to viscous drag
2. Increase the mass available for primary energy absorption
3. Increase the reaction mass
4. Keep the undamped free surface within the plenum at the mean sea level
5. Adopting alternative operating modes or a survival mode to suit the prevailing conditions, specifically:
   A. as a resonant heaving buoy
   B. as a surface follower without inertial mass
   C. as a surface follower with inertial mass
   D. a survival or fail-safe mode
6. Improving the control systems, specifically by:
   6.1. a more precise method of adjusting the inertial mass attached to the heaving buoy
   6.2. a method of adjusting the ratio of the mass of the heaving buoy to that of the reaction mass in order to maximise recoverable power
7. Improve availability by installing two or more power trains, for example the use of smaller air turbines that can individually operate at higher frequencies.

These are now described in more detail.

1. Reducing viscous drag. The inertial mass of seawater is now held in a number of smooth uninterrupted vertical pipes, extending from the surface-piercing float to the bottom of the spar buoy. These will be of a diameter sufficient to ensure minimum resistance to the flow of water within them. The Reynolds number for seawater with a maximum velocity of 2 m/sec flowing through a smooth extruded plastic water-pipe of diameter 500 mm will be less than 2,300, the threshold for transitional flow. The shape of the device, as shown in FIGS. 2 and 5C, is intended to reduce losses as the device heaves and to make the ratio of viscous drag to total mass as favourable as possible.

2. Increase the mass of the heaving buoy. For any given velocity or displacement, the amount of energy, kinetic and potential, that may be absorbed by a heaving buoy will be limited by its mass. The maximum diameter of an axisymmetric point absorber is constrained by the wave climate in which it is to be deployed. For a North Atlantic offshore site, the practicably available wave energy is centred around wave lengths of 180 m, i.e. 50% of the raw energy corresponds to wavelengths greater than 180 m, suggesting point absorber diameters from 20-30 m. This defines the waterplane area or spring constant, and the wave frequency defines the size of the mass coupled to the float that will result in the ideal heave eigen value, typically five or more times the displacement. Ensuring that the floating body may support a mass that is several times its displacement is achieved by having a large fraction of the physical mass as neutrally buoyant seawater. It is important that a large fraction (of the order of 50%) of the base of the surface-piercing float is available to react with the upper few metres of the sea. This constrains the cross-sectional area within which this inertial mass may be attached. The result will be a slender spar buoy with substantial draft.

3. Increase the reaction mass: The heaving buoy must react against a comparably large mass if most power is to be recovered from their interaction. Based on laboratory tests and extrapolations using a validated numerical tank, substantial dividends are to be gained by increasing the reaction mass. As was discussed above, the data from the simulations that are referenced in FIG. 12 shows that the average power has more than doubled using a device per the present teaching over previous, now known, arrangements.

4. Keep the undamped free surface within the plenum at the mean sea level. With a shorter water column, as indicated in WO2015/001115 and recorded in tank tests, the passing waves may cause the internal free surface to rise and fall, thus diminishing the effect of the heaving buoy on the trapped air volume. Having the level of the internal free surface independent of the external sea level results in an important improvement in the amount of power recoverable in each wave period. In still water and with no damping, a volume of air 5 is trapped above the enclosed column of water 4 whose internal free surface will tend to remain at the mean sea level on account of the draft of tube 2 extending to depths of the order of half a wavelength.

When damping is applied, as intended by the closed cycle power take-off system described, the trapped volume of air 5 operably varies.

In both the heaving buoy and the surface following operating modes, the mass of the buoy and the mass of the internal water column react against each other through this trapped volume of air, acting to expand it and to compress it in every cycle.

In both operating modes, this trapped volume of air 5 will act as a spring of varying stiffness placed between the mass of the buoy and the mass of the internal water column. This in turn will tend to elevate and depress the level of the internal free surface.

With inlet 21 and outlet 22 valves as shown in FIG. 9, the system will act as a pump, forcing air around the power take-off circuit.

5. The wave energy converter in accordance with the present teaching may be set to convert wave energy by means of one of three different operating modes, selected to match the prevailing conditions. A fourth setting is adopted in extreme seas or as a fail-safe mode.

The present inventor has identified that in any one wave location, that there are different sea conditions within which a device may be exposed. Typically, a device is optimised for any one type of wave climate. However, whilst that wave climate may be the dominant wave climate it may not always be the prevailing wave climate. For example, in the North Atlantic, and shown in the data set of FIG. 7 it is possible to identify four distinct regions A, B, C, and D each of which have identifiable different ranges of wave heights and wave periods. Within each of these regions a device that operates differently can optimally extract energy from these conditions. Per the present teaching, the operation of the device can be modified to suit the prevailing conditions.

These will each be described in turn:

A. as a resonant heaving buoy point absorber, the primary mode for the device as described here. Varying the amount of the inertial mass retained will allow some adjustment of the natural frequency in heave. The heave response may also be controlled by latching by means of valves between the pumping chamber 5 and the HP and LP air accumulators, or by altering the system air pressure, or by a combination of these options.

B. as a surface follower in waves of a similar period but greater height where resonant conditions can arise but where the amplitude of the heave response could be damaging. Opening all valves 12, as may be appropriate during high waves, will de-couple the inertial mass from the surface-piercing buoy with the result that it will cease to act as a resonating heaving buoy and it will behave as a surface follower. As the buoy continues to rise and fall with the surface, it will create alternating pressures in the air plenum 5 and convertible energy may be recovered.

C. as a surface follower in waves of a longer period, where resonant conditions will not arise, assured by the high Q factor for the resonant response due to the streamlined shape of the device. In these conditions the inertial mass may be safely retained even though the wave height may be such that a resonant response could be damaging if it were to occur. More energy may be recovered when the mass of the buoy is close to that of the water column. These longer period waves will have a wavelength greater than twice the length of the central water column 4 with the result that, in these conditions, wave motion may be appreciably sensed by the central water column causing it to act as an oscillating water column. Additional energy may be recovered from this combination of a surface follower with an internal oscillating water column provided that a sufficient phase difference may be maintained between the two. The inclusion of the adjustable inertial mass will help.

D. In a survival mode where the prevailing conditions are possibly destructive, it is important that the device operation can be controlled to avoid damage. This can be done by adopting the mode B where all valves 12 are open but at the same time air is free to pass between the accumulators bypassing the turbines and as a result there is no power generated.

It is to be noted that switching between these four modes can be triggered by changes in the prevailing wave heights and wave periods, either as sensed by on-board instrumentation and control software, or as up-loaded by remote control. The change is made to happen by releasing or by re-securing the inertial mass, held by valves 12 and atmospheric pressure.

Whilst the device is optimised typically for the dominant conditions of the geographical area where it is to be located, it will be appreciated that these dominant conditions may not necessarily be the prevailing conditions. Hence the importance of the device being configured to transition between different operating modes.

Figure 7:
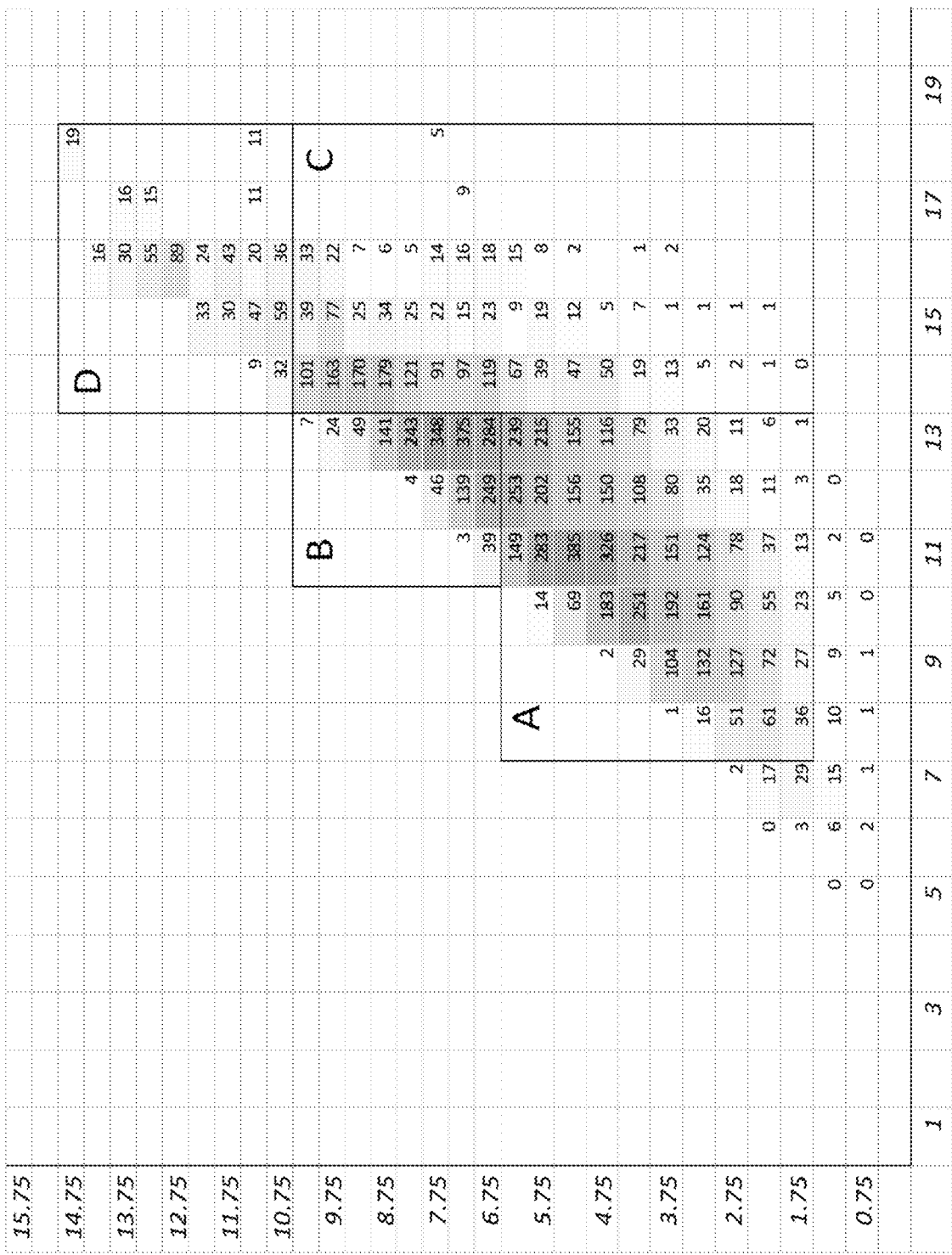
FIG. 7 indicates how three different operating modes, A, B, C and a safe mode, D, may be selected to match the prevailing wave climate using exemplary data from the Atlantic Marine Energy Test Site, AMETS.

It will be understood that in any one deployment location that there will be a prevailing set of conditions within which the device is most likely to be operating. For example, using data from the Atlantic Marine Energy Test Site (AMETS) outer berth as shown in FIG. 7, the following table confirms that operating in Mode A is the most prevalent and hence the device should be optimised for operating in Mode A.

TABLE A

| maximising energy recovery with additional operating modes | | |
| --- | --- | --- |
| Occurrences | Energy | Mode |
| A 72.7% | 54.8% | Resonant heaving buoy |
| B 5.7% | 20.0% | Surface follower, no inertial mass |
| C 4.7% | 18.1% | Surface follower, plus inertial mass |
| D 0.5% | 6.1% | Survival mode |
| 83.6% | 98.9% | |

It is also to be noted that the physical dimensions and control strategies will be those that ensure the most cost-effective conversion of the available wave energy to useful power.

For this example therefore, the device will primarily operate as a resonant heaving buoy point absorber but can also operate as a surface follower in one of two distinct modes—with our without inertial mass retained. Evidently, an additional mode adopted during repair or during extreme weather conditions is a fourth mode.

6.1 Improved control systems, adjusting the inertial mass. An oscillating system will absorb most energy when its natural period matches that of the incident wave field and resonance may be achieved. One method of controlling the natural period in heave is achieved in the present system by adjusting the inertial mass. The relationship of the heave period to the mass and a fixed water-plane area (corresponding to the restoring or buoyancy spring) are given by the approximate formula:

$$\text{Period} = 2\pi \sqrt{\frac{\text{mass} + \text{added mass}}{\rho g(\text{waterplane area})}}$$

For example, for a unit suitable for a North Atlantic site, this indicates that for a heaving buoy point absorber with a 12.5 metre radius float and 5 m draught in still water, a total mass of approximately 13,000 kgs is required if the natural frequency in heave is to match a 10" wave period. The corresponding values are, in round figures:

TABLE B

| | | |
|---|---|---|
| mass + added mass | 13,000 | tonnes |
| float radius | 12.5 | meters |
| hence, period | 10 | seconds |
| float draught, at rest | 5 | meters |
| displaced volume | 2,455 | m$^3$ |
| displacement in seawater | 2,516 | tonnes |
| add, nominally, for added mass | 484 | tonnes |
| Total not seawater, when heaving: | 3,000 | tonnes |

The tubes 8 in FIGS. 2 and 3 together hold the entirety of the adjustable inertial mass of the heaving buoy.

With a suitably defined set of tubes a range of natural frequencies in heave is possible, as indicated here, in round figures:

TABLE C

| Total mass, tonnes | 'Adjustable' fraction, tonnes | % entrained | Retained inertial mass | Total heaving mass | Period, seconds |
|---|---|---|---|---|---|
| 13,000 | 10,000 | 100% | 10,000 | 13,000 | 10 |
| | | 75% | 7,500 | 10,500 | 9 |
| | | 50% | 5,000 | 8,000 | 8 |
| | | 25% | 2,500 | 5,500 | 7 |
| | | 0% | — | 3,000 | 5 |

Exact values will follow detailed engineering design and empirically validated numerical modelling in the context of a specified wave climate, taking account of factors such as viscous drag, radiation losses and mooring loads. It is clearly important to maximise the adjustable fraction of the total mass as the natural heave period is inversely proportional only to the square root of its size. A smaller fraction of the total is the ballast required to maintain the design displacement of the surface-piercing float. Replacing steel by polymers minimises the mass of the structure itself.

6.2 Improved control systems, adjusting the mass ratios. The importance of the ratio of the total mass of the heaving buoy to the mass against which it reacts was not recognised in WO2015/001115. As indicated in FIG. 13, analysis shows that a constant buoy-to-water-column mass ratio of approximately 1 would potentially forfeit a lot of energy.

Consequently, the present invention incorporates two control strategies that are based on adjusting one or both of the interacting masses and describes exemplary methods of achieving desirable results. These are:

Altering the natural frequency in heave of the primary energy absorber to ensure resonance.

Altering the ratio of the mass of the absorber to the mass against which it reacts to ensure maximum recoverable energy.

TABLE 1

Switching mass between buoy and water column

| | | |
|---|---|---|
| Radius | 1250 | mm |
| Length | 90 | m |
| Switching multiples of | 453 | tonnes |

| Buoy m1 | Number switched | Water column m2 | Ratio m1/m2 | Total switched |
|---|---|---|---|---|
| 9642 | 3⇒ | 12358 | 0.78 | 1358 |
| 10094 | 2⇒ | 11906 | 0.85 | 906 |
| 11000 | | 11000 | 1.00 | 0 |
| 11906 | ⇐ 2 | 10094 | 1.18 | 906 |
| 12358 | ⇐ 3 | 9642 | 1.28 | 1358 |

Table 1. A portion of the internal water column is included in vertical tubes open to the sea at the bottom and to the air plenum within the plenum at the top, with the option of closing the top of each tube. These tubes are integral with the main structure of the heaving buoy. When open at both ends the seawater within each tube is a part of the mass of the water column. When closed at the top the mass of water within the tube becomes integral with the mass of the heaving buoy. This provides a method of switching mass between the heaving buoy and the water column, thus changing the mass ratio between the two.

TABLE 2

Adjusting the inertial mass of the buoy
Adjust only the buoy's inertial mass

| | | |
|---|---|---|
| Radius | 1500 | mm |
| Length | 90 | m |
| Multiples of | 652 | tonnes |

| Number of tubes | Buoy m1 | Water column m2 | Ratio m1/m2 | Total tonnes |
|---|---|---|---|---|
| −5 | 7740 | 11000 | 0.70 | −2264 |
| −3 | 9044 | 11000 | 0.82 | −1358 |
| 0 | 11000 | 11000 | 1.00 | 0 |
| 3 | 12956 | 11000 | 1.18 | 1358 |
| 5 | 14260 | 11000 | 1.30 | 2264 |

Table 2. The only mass adjusted is that of the heaving buoy, that is the inertial water mass. With the mass of the internal water column remaining un-adjusted it will be necessary to make a greater increase to the buoy mass than the mass-switching option described above if a comparable range of mass ratios is to be achieved.

Although it includes more and larger tubes for the same effect, the second of the above two options has the advantage of being mechanically simpler and easier to control. It also results in a greater mass for the heaving buoy, a potential advantage for energy absorption in the longer period waves which tend to be associated with greater wave heights and energy flux. It is to be noted that these values are illustrative examples.

7. Improve availability by installing two or more power trains. The flow of wave energy may change from a few kilowatts/metre to well over a megawatt/metre in the space of a day or two. There is also a marked seasonal variation. For this reason, the wave energy converter in accordance with the present teaching may incorporate two or more power trains. This is readily managed in a device sized for the North Atlantic as described above. Each power train will include three basic sub-components, an air turbine, a generator, and power electronics. With for example four such power trains, and not necessarily of the same capacity, the total capacity engaged at any time may be adjusted to more closely match the prevailing energy flux than would be possible with a single, and necessarily large, power train. This will improve overall energy absorption and performance. Such an arrangement has other advantages:
  a. Smaller sub-components,—easier to un-plug, replace and service off-site
  b. Easier to maintain constant RPM
  c. Much greater availability In this context it will be noted that 'capacity factor' ceases to be a meaningful metric; carrying stand-by capacity on board would add marginally to capital costs but, by increasing availability, could improve the economics and reduce the levelized cost of electricity, the measure of the average net present cost of electricity generation for a generating plant over its lifetime.

Two Crucial Issues:
A device in accordance with the present teaching addresses the two crucial issues mentioned in the opening background art section above:
  Survival, both in extreme conditions and over the lifetime of the development
  Cost of electricity delivered to the grid.

Survival
A device per the present teaching is configured as an axi-symmetric spar buoy with a smooth and entirely uninterrupted and streamlined shape that can heave as a unitary body. With appropriate moorings, for example dynamic tethers, this will be eminently seaworthy.

The device now incorporates the following safe operating or fail-safe features, described in more detail above:
  Release valves (12 in FIGS. 10, 11) that are energised closed
  An alternative fail-safe arrangement (FIG. 11) in the event of extreme excursions
  Vacuum release valve (17 in FIG. 10)
  By-pass valves (19 in FIG. 9A) that equalise the HP and LP accumulator pressures such that power generation ceases.

The typical wave frequency for an exposed offshore site will account for of the order of 3 million cycles in a year, more than 60 million in the lifetime of a typical offshore renewable energy project. It will be appreciated that for a device per the present teaching the risks and implications of failure due to fatigue or component failure are reduced, notably because:
  this is a single seaworthy spar buoy, with no bearing surfaces, articulations or end-stops
  all moving parts are above the waterline and located in an enclosed PTO deck
  there are only three components in each power train, and there will be more than one such power train
  there are several fail-safe mechanisms, protecting the device from run-away oscillations Cost of Electricity
The levelised cost of electricity is conventionally determined by discounting costs and income over the duration of the project, using the formula $$LCOE = \frac{CAPEX + \sum_{t=1}^{n} \frac{OPEX_t}{(1+r)^t}}{\sum_{t=1}^{n} \frac{\text{Annual Energy } Production_t}{(1+r)^t}}$$

The present invention reduces costs and increases performance in the following key respects:
Reduced costs: CAPEX and OPEX:
  Approximately 75% of the operating mass of the heaving buoy is seawater and added mass, and this reacts against a mass that is 100% seawater. It will be appreciated that such an arrangement has not been utilised previously in heaving buoys.
  Using atmospheric pressure rather than underwater flap valves to hold the inertial masses greatly reduces capital costs.
  Inertial mass of seawater held in a multiplicity of simple tubes, which could for example be standard HDPE.
  Large underwater flap valves replaced by smaller valves of a standard form, accessible on the PTO deck, and readily serviced and replaced.

Improved Performance
The performance of the wave energy converter in accordance with the present teaching is an improvement on WO2015/001115 in several respects. These improvements may be grouped under four headings: operating mass, three operating modes, reduced losses, and improved efficiency of the power take-off.

1. Operating mass:
  a. Energy absorption: The size of the mass that is being moved by wave action dictates the amount of energy that may be absorbed. For a point absorber, the diameter of the surface-piercing buoy must remain 'small' with respect to the dominant wave period, thus limiting the scope for a large (and necessary neutrally buoyant) mass unless extended vertically below. This is achieved in the present invention by adopting a spar buoy shape with a substantial draft and capacity to retain a large mass of seawater.
  b. Energy recovery: To recover the energy absorbed, it is important to have a comparably large mass to react against, achieved here by extending the internal water column.
  c. Adjustable mass ratios: Analysis indicates that a further improvement may be obtained by being able to adjust the ratio between the two masses with changes in the prevailing conditions. This fine tuning may be achieved by adjusting the inertial mass in the heaving buoy.
  d. Better control of the inertial mass: The new system with a multiplicity of tubes facilitates a finer adjustment than in our earlier patent application WO2015/

001115. Each inertial mass tube is controlled by a single fast-operating valve and atmospheric pressure.

2. Three operating modes
   a. Rationale: It will be understood that in any one deployment location a wide range of wave heights and wave periods may be expected over an extended period. This is particularly the case for the North Atlantic, as shown in FIG. 7, being the distribution of the wave energy based on wave data recorded at the Atlantic Marine Energy Test Site (AMETS) outer berth. As summarised in the Table A above a resonant heaving buoy designed to optimise energy conversion for 70% of the time at AMETS would be working on only 55% of the available energy resource. Wave energy is a function of the square of the significant wave height. By providing modes that function in high waves, an additional 38% of the energy resource is available for conversion to useful power. Overall performance is significantly improved by introducing the additional operating modes without having to compromise a high conversion efficiency when acting as a resonant heaving buoy.
   b. As a resonant heaving buoy point absorber. The response bandwidth for a streamlined oscillating point absorber will be narrow, but the response amplitude will be high. As a result, it will perform well over a defined range of wave periods. This range may be widened for the present device by adjusting the inertial mass and by other control tactics such as latching. As summarised in Table A, approximately three quarters of all occurrences at the AMETS site are for wave periods from 8 to 13 seconds, an exemplary range for a resonant heaving buoy with controls as described here.
   c. As a surface follower in a safe mode: A small fraction of the waves of a period where resonance may occur would be beyond the operating scope of a heaving buoy on account of the large wave height and the risk of damaging excursions. By releasing all of the inertial mass, the natural frequency in heave will shift towards higher frequency and smaller waves and the device will behave as a surface follower in the defined range of wave periods.
   d. As a surface follower with full inertial mass: A small fraction of longer wave period waves will be beyond the scope of a heaving buoy designed to resonate effectively at shorter wavelengths. In these conditions it is safe to retain the inertial mass, allowing a mass ratio close to 1 between the buoy and the internal water column and better energy conversion. As noted above, it is possible that the internal water column may begin to oscillate, providing an opportunity for a further improvement in performance.
3. Reduced losses
   a. radiated losses: The uniformly cylindrical shape and extent of the submerged column will eliminate or greatly reduce losses arising from radiated waves during the heave operating mode.
   b. Viscous drag: The uniformly cylindrical shape of the main column, and the large mass of the buoy, will minimise both the size and the significance of any losses due to viscous drag.
   c. PTO losses: When operating, each turbine-generator set will be running at constant rpm thus avoiding losses due to speeding up or slowing down, as would, for example, be usual in an oscillating water column.
   d. Losses due to failures:
      i. The wave energy converter in accordance with the present teaching has no moving parts below the waterline, significantly omitting the at least eight large flap valves in WO2015/001115 that held or released the inertial mass, a failure of any one of which would have incurred high costs and long repair times.
      ii. The present method of retaining or releasing the inertial mass relies on smaller valves that are accessible and quickly replaced.
      iii. As the inertial mass is distributed between several tubes, a failure of one or more controlling valves may have little effect on overall availability of the wave energy converter.
      iv. The device now incorporates more fail-safe systems than before.
4. Improvements to the power take-off
   a. Higher efficiency: The air turbines will operate at a close to steady rpm and at their optimum design flow coefficient.
   b. Better quality power: Constant rpm generators, facilitated by the closed-circuit power take-off system, will generate power of a consistent frequency.

Figure 18:
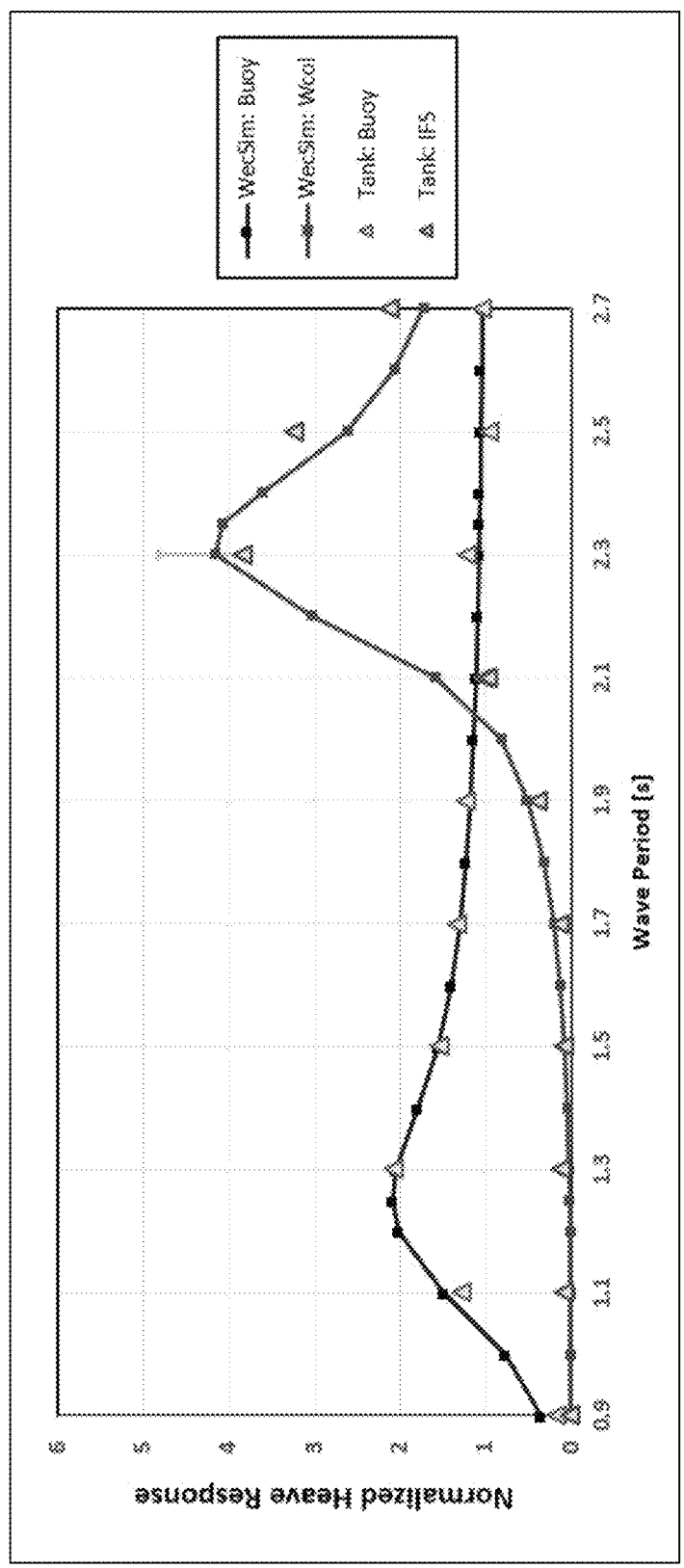
FIG. 18 shows experimental data from scale model wave tank testing superimposed on numerical simulation data showing a device in accordance with the present teaching operating as a heaving buoy for a first wave period range, and as an oscillating water column for a second wave period range.

FIG. 18 shows data from both simulation and experimental scale model wave tank testing which demonstrates how a device in accordance with the present teaching may respond as a resonant heaving buoy for one range of wave periods (those in or around 1.1 to 1.5 seconds in this example), and as an oscillating water column for longer period waves (those about 2.1 to 2.7 seconds). This demonstrates how a device per the present teaching can be usefully used to extract energy from different wave patterns dependent on the actual mode of operation of the device.

Whilst described heretofore in the context of an off-shore wave energy convertor which has both above water and below water features to optimise the conversion of energy arising from an oscillating water column, it will be appreciated that an oscillating water column may also arise in breakwater environments- and the energy convertor that has been described with reference particularly to FIGS. 14, 15 and 16 can have advantageous applications in these scenarios. FIG. 15 shows an example of such a deployment where a PTO system such as that described with reference to FIGS. 14 and 16 for a heaving buoy that is encountered in an off-shore scenario is modified for use in an oscillating water column in a breakwater scenario. In this scenario, the power take off is provided within a structure that is located on the shoreline.

At least a portion of the PTO projects into the water to provide a pumping chamber 1601 that is exposed to the sea. The movement of sea at the shoreline can create an oscillating water column within that pumping chamber 1601. The pumping chamber 1601 is in fluid communication with a high pressure air accumulator 1603 via a valve 1602 that can be used to selectively vary the air flow from the pumping chamber into the air accumulator. Similarly to FIG. 14, air turbine sets 1604 are provided between the air accumulator and atmospheric conditions such that air can be vented from the air accumulator through the air turbines to an exhaust vent 1605. In the event of bypass requirements, another set of valves 1608 can provide a path to atmosphere that does not require passage through the air turbines. Air can be fed back into the pumping chamber 1601 via a valve controlled entry port 1605.

It will be appreciated that the same HP air accumulator 1603 may serve for a multiplicity of pumping chambers 1601.

Whilst the present teaching has therefore been exemplified with reference to preferred arrangements, it will be appreciated that these have been to provide an understanding of the present teaching and that modifications can be made without departing from the scope which is limited only insofar as is necessary in the light of the following claims.

What is claimed is:

1. A wave energy converter comprising:
a resonant heaving buoy point absorber comprising:
a surface piercing float operably coupled to a water column tube, the water column tube having a top provided proximal to the surface piercing float, and a bottom provided distally to the surface piercing float, the water column tube extending downwardly from the surface piercing float, the water column tube being open at the bottom and being configured to accommodate a column of sea water therein, the water column tube being in communication with an air plenum provided within the surface piercing float to effect a trapping of a volume of air above a top surface of the column of water accommodated within the water column tube, the air plenum being configured such that operably movement of the resonant heaving buoy point absorber expands and compresses the trapped volume of air; and
a power take off, PTO, module in communication with and responsive to air vented from the air plenum resultant from a reaction of the heaving buoy point absorber against the top surface of the enclosed column of sea water;
a plurality of adjustable inertial mass tubes arranged around the water column tube, each adjustable inertial mass tube having a top and a bottom, the bottom of each adjustable inertial mass tube being in open fluid communication with sea water, each inertial mass tube being configured to accommodate a mass of sea water therein, the retention of the mass of sea water being controlled by a valve in fluid communication with the top of the inertial mass tube such that sea water is retained in the inertial mass tube during a movement of the point absorber in response to wave action thereon;
a fixed mass ballast;
wherein the surface piercing float, the water column tube, the plurality of adjustable inertial mass tubes and ballast are configured to rise and fall together as a unitary body in response to passing waves.

2. The wave energy converter of claim 1, wherein the air plenum is operatively provided above the top surface of the column of water.

3. The wave energy converter of claim 1, configured such that the resonant heaving buoy point absorber, when oscillating in a heave mode, has a mass of the order of five times greater than an equivalent mass caused by the displacement of the surface piercing float when in still water.

4. The wave energy converter of claim 1, wherein the water column tube has a length not less than half a wavelength of the dominant wave lengths within the geographical location where the converter is deployed.

5. The wave energy converter of claim 1, being operable in first and a second mode, the first mode being as a resonant heaving buoy and the second mode being as a surface follower, wherein when operating in the surface follower mode, the respective valves of each of the adjustable inertial mass tubes are configured to be open such that the adjustable inertial mass tubes retain no sea water.

6. The wave energy converter of claim 5, configured such that in each operating mode, in the absence of damping, the column of sea water within the water column tube has an internal free surface which will tend to remain at mean sea level.

7. The wave energy converter of claim 5, being operable in a third mode, the third mode being as a surface follower with an adjustable inertial mass, the third mode being adopted through use of the valve of each of the adjustable inertial adjustment of a volume of sea water retained within one or more of each of the adjustable inertial mass tubes.

8. The wave energy converter as claimed in claim 7 wherein, when operating in the third mode, the device is configured such that sea water within the internal water column tube oscillates as a water column.

9. The wave energy converter of claim 1, wherein in response to closure of the valve for a respective inertial mass tube atmospheric pressure alters the amount of sea water retained within that inertial mass tube.

10. The wave energy converter of claim 1, wherein the PTO module comprises air turbines, a first air accumulator and a second air accumulator, the air accumulators being in fluid communication with the plenum and respectively responsive to air being forced from the plenum during a compression stroke and air being drawn into the plenum during an expansion stroke, the converter being configured to operate in a fail-safe mode, the fail-safe mode being adopted by adjusting an opening of the valves of each of the adjustable inertial mass tubes such that the adjustable inertial mass tubes retain no sea water and opening of a valve between the first air accumulator and second air accumulator so that any difference in air pressure between them is eliminated and the air turbines are by-passed.

11. The wave energy converter of claim 1, wherein one or more of the inertial mass tubes comprise a vacuum release valve, the converter being configured to operate in a fail-safe mode, the fail-safe mode being adopted by an automatic opening of the vacuum release valve on the one or more of the inertial mass tubes in response to sensed extreme sea conditions.

12. The wave energy convertor of claim 1 wherein the first air accumulator is configured as a high-pressure accumulator and the second air accumulator is configured to be at atmospheric pressure, the wave energy converter being configured such that operatively air is forced from the plenum into the first air accumulator during the compression stroke and drawn into the plenum from the atmosphere during the expansion stroke.

* * * * *